(12) United States Patent
Kim et al.

(10) Patent No.: US 9,031,028 B2
(45) Date of Patent: May 12, 2015

(54) METHOD FOR TRANSMITTING AND RECEIVING DOWNLINK CONTROL INFORMATION IN WIRELESS COMMUNICATION SYSTEM AND DEVICE THEREFOR

(75) Inventors: Hakseong Kim, Anyang-si (KR); Hanbyul Seo, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 112 days.

(21) Appl. No.: 13/980,235

(22) PCT Filed: Jan. 18, 2012

(86) PCT No.: PCT/KR2012/000431
§ 371 (c)(1),
(2), (4) Date: Jul. 17, 2013

(87) PCT Pub. No.: WO2012/102510
PCT Pub. Date: Aug. 2, 2012

(65) Prior Publication Data
US 2013/0301597 A1  Nov. 14, 2013

Related U.S. Application Data

(60) Provisional application No. 61/436,574, filed on Jan. 26, 2011, provisional application No. 61/497,929, filed on Jun. 16, 2011.

(51) Int. Cl.
*H04W 4/00* (2009.01)
*H04W 72/04* (2009.01)
*H04L 5/00* (2006.01)
*H04L 1/18* (2006.01)

(52) U.S. Cl.
CPC ........... *H04W 72/042* (2013.01); *H04L 1/1861* (2013.01); *H04L 5/001* (2013.01); *H04L 5/0037* (2013.01); *H04L 5/0048* (2013.01); *H04L 5/0053* (2013.01); *H04L 5/0055* (2013.01); *H04L 5/0035* (2013.01)

(58) Field of Classification Search
None
See application file for complete search history.

(56) References Cited

U.S. PATENT DOCUMENTS

| | | | |
|---|---|---|---|
| 8,019,017 B2* | 9/2011 | Ahn et al. | 375/300 |
| 2010/0215004 A1* | 8/2010 | Yoo | 370/329 |
| 2010/0246499 A1* | 9/2010 | Kim et al. | 370/329 |
| 2012/0020421 A1* | 1/2012 | Larsson et al. | 375/260 |
| 2012/0287848 A1* | 11/2012 | Kim et al. | 370/315 |
| 2013/0301597 A1* | 11/2013 | Kim et al. | 370/329 |

(Continued)

FOREIGN PATENT DOCUMENTS

| | | |
|---|---|---|
| KR | 10-2007-0121589 A | 12/2007 |
| KR | 10-2009-0055900 A | 6/2009 |
| KR | 10-2010-0038852 A | 4/2010 |

*Primary Examiner* — Robert Wilson
(74) *Attorney, Agent, or Firm* — Birch, Stewart, Kolasch & Birch, LLP

(57) ABSTRACT

Disclosed is a method for allowing a terminal to receive a downlink signal from a base station in a wireless communication system. More specifically, the method comprises the steps of: receiving a first control channel which indicates the location information of a resource allocated to a second control channel; receiving the second control channel, on the basis of a control format indicator contained in the first control channel; and obtaining a downlink grant and/or an uplink grant contained in the second control channel, wherein the second control channel is allocated with the resource contained in a data region of a specific subframe.

8 Claims, 13 Drawing Sheets

(56) References Cited

U.S. PATENT DOCUMENTS

2014/0044084 A1* 2/2014 Lee et al. ............ 370/329
2014/0056244 A1* 2/2014 Frenne et al. ........ 370/329
2014/0328312 A1* 11/2014 Seo et al. ............ 370/329
2014/0362720 A1* 12/2014 Kim et al. ............ 370/252

* cited by examiner

FIG. 2
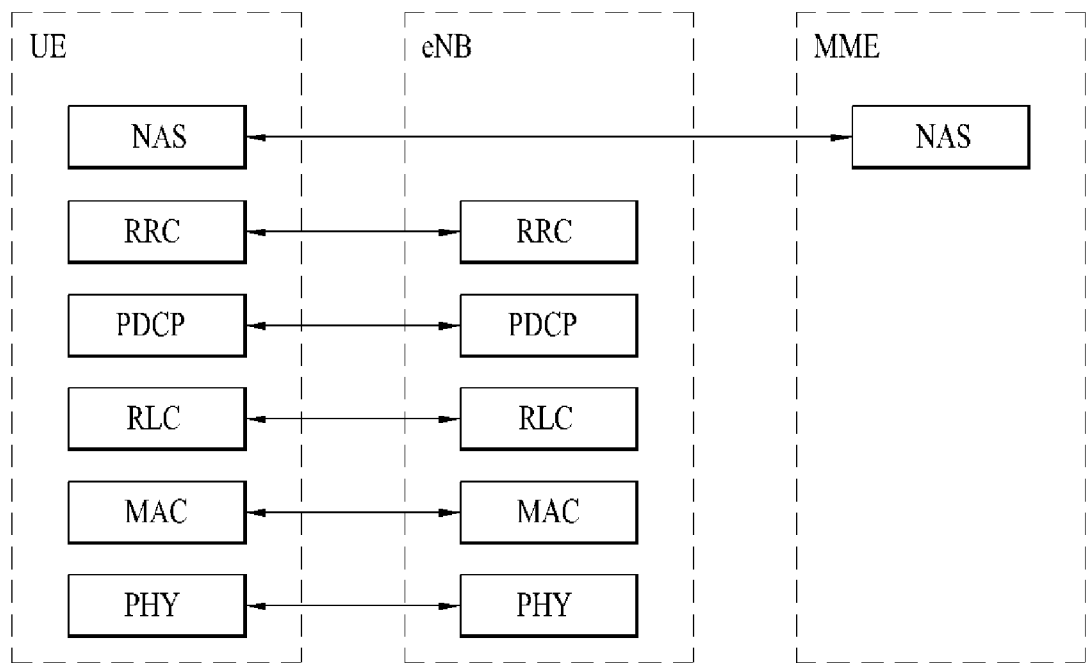
(a) contol - plane protocol stack
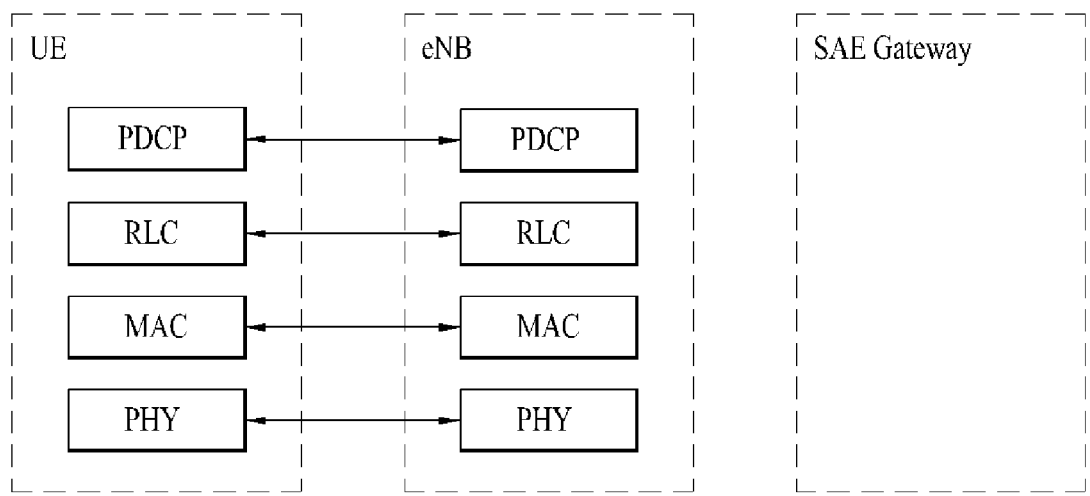
(b) user - plane protocol stack

*CFI value indicates starting symbol position of E-PDCCH and PDSCH

*CFI value indicates starting symbol position of E-PDCCH and PDSCH

METHOD FOR TRANSMITTING AND RECEIVING DOWNLINK CONTROL INFORMATION IN WIRELESS COMMUNICATION SYSTEM AND DEVICE THEREFOR

This application is the National Phase of PCT/KR2012/000431 filed on Jan. 18, 2012, which claims priority under 35 U.S.C. 119(e) to U.S. Provisional Application Nos. 61/436,574 filed on Jan. 26, 2011 and 61/497,929 filed on Jun. 16, 2011, all of which are hereby expressly incorporated by reference into the present application.

TECHNICAL FIELD

The present invention relates to a wireless communication system, and more particularly, to a method and apparatus for transmitting and receiving downlink control information in a wireless communication system.

BACKGROUND ART

A brief description will be given of a $3^{rd}$ Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on standardization of E-UMTS. E-UMTS is also called an LTE system. For details of the technical specifications of UMTS and E-UMTS, refer to "$3^{rd}$ Generation Partnership Project; Technical Specification Group Radio Access Network" Release 7 and Release 8, respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectations of users and service providers are increasing. Considering that other radio access technologies are under development, new technological evolutions are required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the conventional problem is to provide a method and apparatus for transmitting downlink control information in a wireless communication system.

Technical Solution

In an aspect of the present invention, a method for receiving a downlink signal in a specific subframe from a base station at a user equipment in a wireless communication system includes receiving a first control channel indicating position information about resources allocated to a second control channel, receiving the second control channel based on a control format indicator included in the first control channel, and acquiring at least one of a downlink grant and an uplink grant from the second control channel. The second control channel is allocated to resources included in a data region of the specific subframe.

The method may further include receiving a third control channel indicating whether the second control channel is transmitted.

In another aspect of the present invention, a user equipment in a wireless communication system includes a reception module for receiving a downlink signal in a specific subframe from a base station, and a processor for processing the downlink signal. The reception module receives a first control channel indicating position information about resources allocated to a second control channel and receives the second control channel based on a control format indicator included in the first control channel, and the controller acquires at least one of a downlink grant and an uplink grant from the second control channel. The second control channel is allocated to resources included in a data region of the specific subframe.

The reception module may further receive a third control channel indicating whether the second control channel is transmitted.

The control format indicator in the first control channel may indicate the index of a starting symbol of the second control channel, the index of an ending symbol of the second control channel, or the indexes of starting and ending symbols of the second control channel.

The second control channel may be precoded together with a data channel based on a reference signal.

The third control channel may be a Physical Control Format Indicator Channel (PCFICH) and whether the second control channel is transmitted may be indicated by a specific state indicated by a control format indicator of the PCFICH.

Advantageous Effects

According to the embodiments of the present invention, a base station can transmit downlink control information effectively, while avoiding inter-cell interference in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 2 illustrates a control-plane protocol stack and a user-plane protocol stack in a radio interface protocol architecture conforming to a $3^{rd}$ Generation Partnership Project (3GPP) radio access network standard between a User Equipment (UE) and an Evolved UMTS Terrestrial Radio Access Network (E-UTRAN);

BEST MODE FOR CARRYING OUT THE INVENTION

Figure 1:
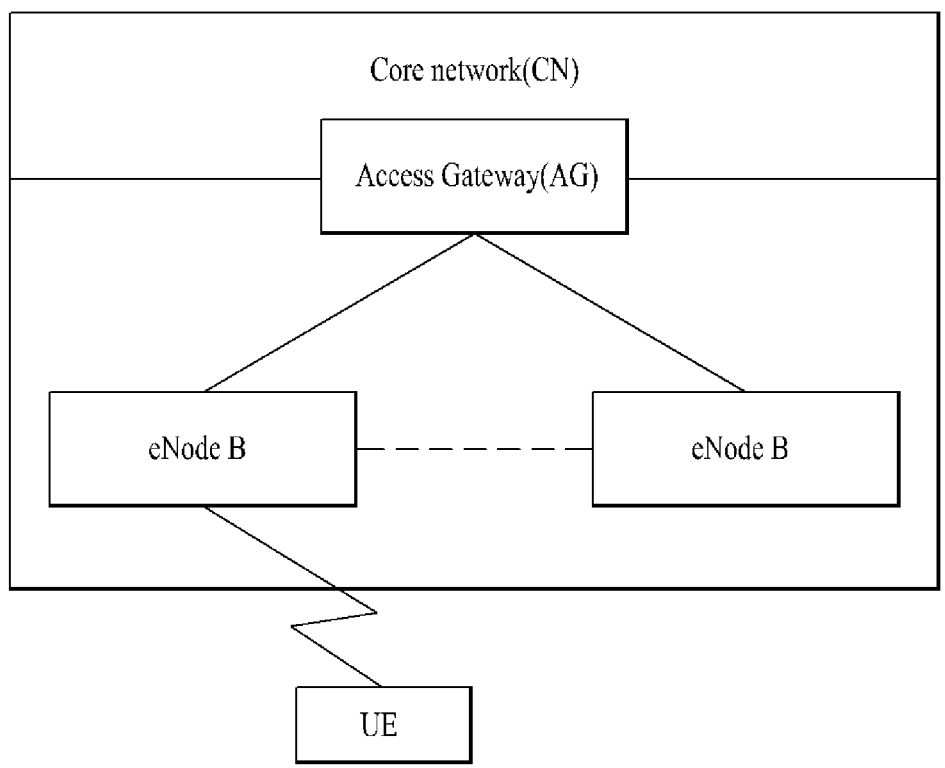
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a $3^{rd}$ Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell covered by an eNB is set to one of the bandwidths of 1.25, 2.5, 5, 10, 15, and 20 MHz and provides downlink or uplink transmission service in the bandwidth to a plurality of UEs. Different cells may be set to provide different bandwidths.

Downlink transport channels used to deliver data from the E-UTRAN to UEs include a Broadcast Channel (BCH) carrying system information, a Paging Channel (PCH) carrying a paging message, and a Shared Channel (SCH) carrying user traffic or a control message. Downlink multicast traffic or control messages or downlink broadcast traffic or control messages may be transmitted on a downlink SCH or a separately defined downlink Multicast Channel (MCH). Uplink transport channels used to deliver data from a UE to the E-UTRAN include a Random Access Channel (RACH) carrying an initial control message and an uplink SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
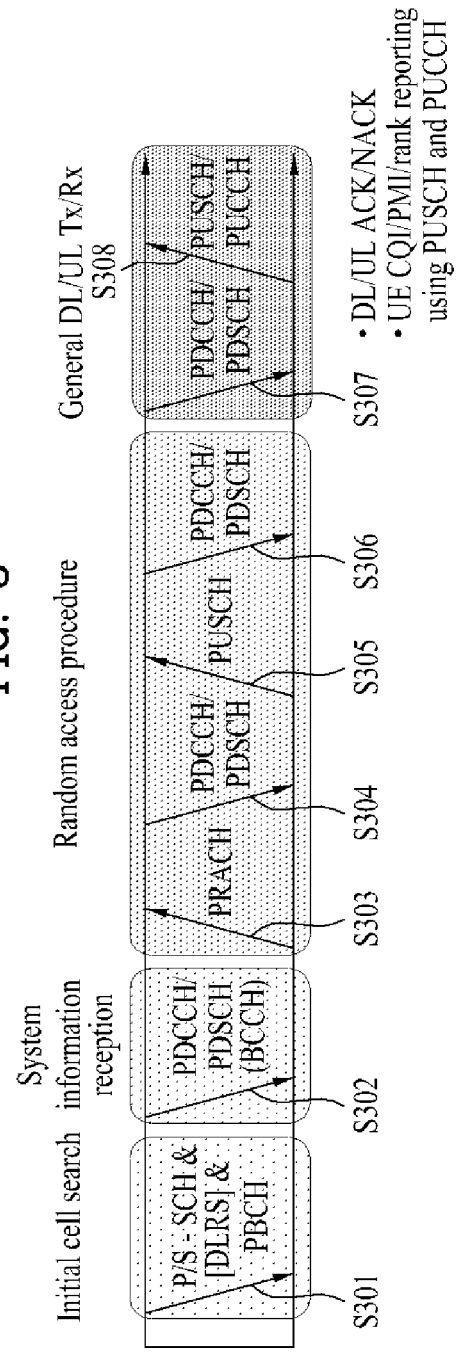
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general downlink and uplink signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the uplink or receives from the eNB on the downlink includes a downlink/uplink ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
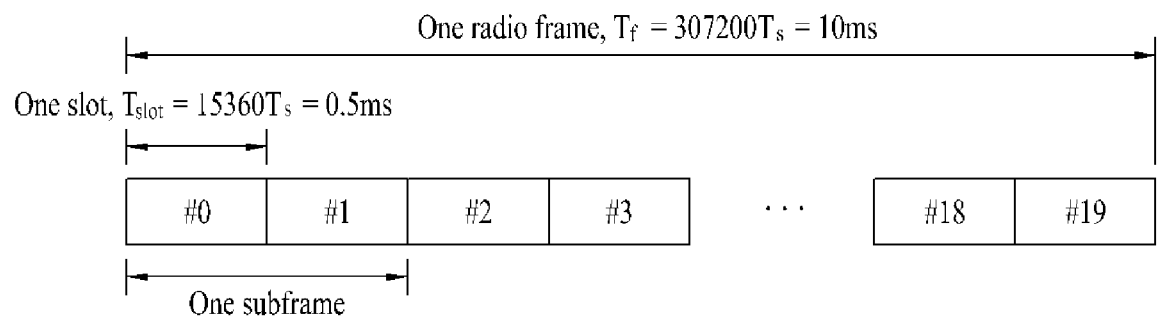
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15 kHz×2048)=3.2552×10^{-8}$ (about 33 ns). A slot includes a plurality of OFDM symbols or SC-FDMA symbols in the time domain by a plurality of Resource Blocks (RBs) in the frequency domain. In the LTE system, one RB includes 12 subcarriers by 7 (or 6) OFDM symbols. A unit time in which data is transmitted is defined as Transmission Time Interval (TTI). The TTI may be defined as one or more subframes. The above-described radio frame structure is purely exemplary and thus the number of subframes in a radio frame, the number of slots in a subframe, or the number of OFDM symbols in a slot may vary.

Figure 5:
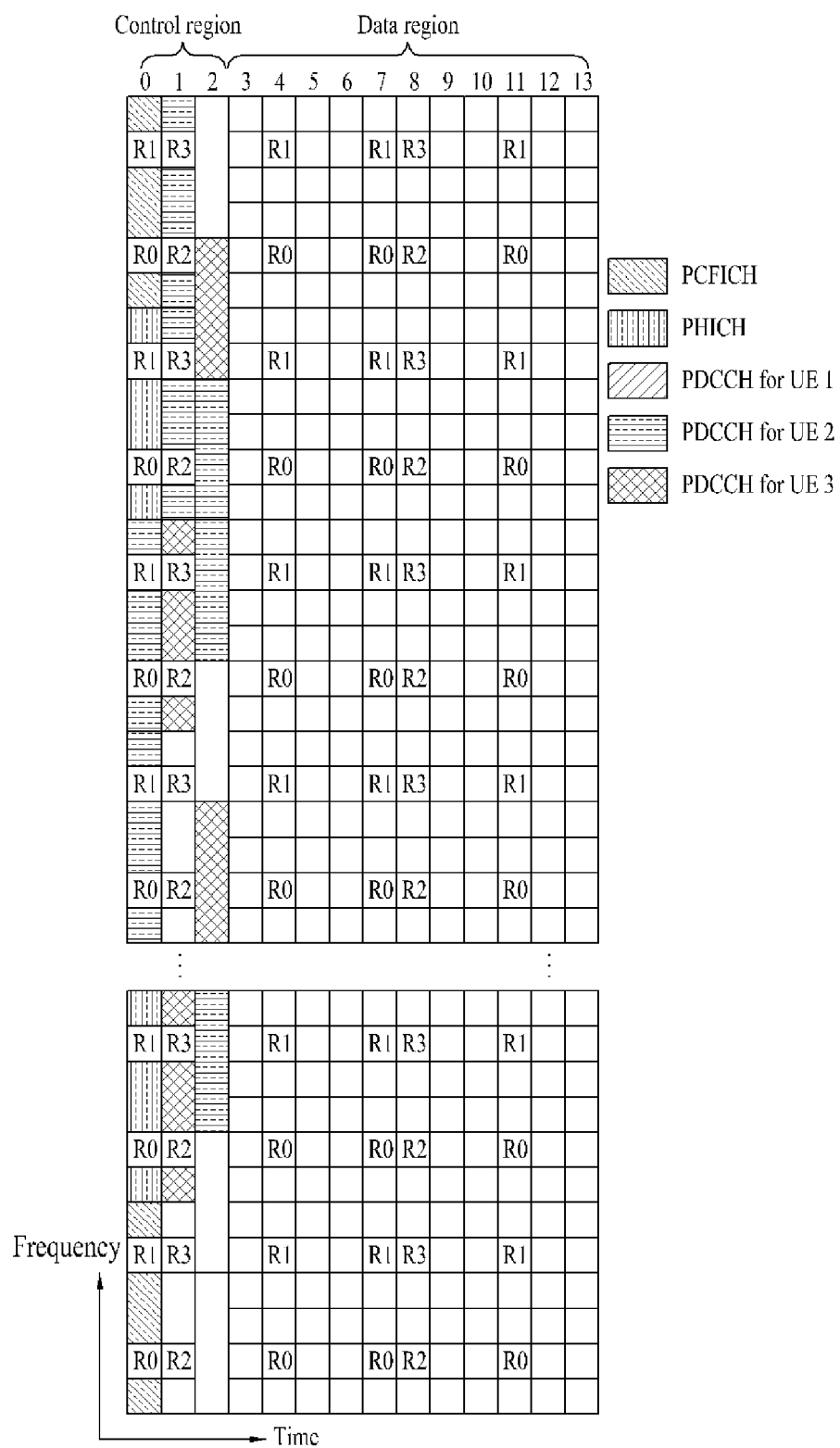
FIG. 5 illustrates a structure of a downlink radio frame in the LTE system.

FIG. 5 illustrates an exemplary control channel included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH indicates 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Herein, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors a PDCCH using its RNTI information. If one or more UEs have RNTI "A", these UEs receive the PDCCH and receive a PDSCH indicated by "B" and "C" based on information of the received PDCCH.

Meanwhile, when the channel state between an eNB and a UE is poor, a Relay Node (RN) is installed between them to provide a better radio channel to the UE. In addition, use of an RN at a cell area where a channel from an eNB is in poor state can provide a high-speed data channel and extend cell service coverage. RNs have been introduced to eliminate shadowing areas and are widely deployed in a wireless communication system.

Conventionally, relaying was confined to the function of a repeater that simply amplifies a signal and forwards the amplified signal. However, more intelligent relay schemes have recently been developed. Furthermore, relaying is a requisite technology to reduce eNB installation cost and backhaul maintenance cost, while extending service coverage and increasing data throughput in a future-generation mobile communication system. Along with the growth of relaying techniques, there exists a need to support an RN used in a conventional wireless communication system for a new wireless communication system.

In a 3GPP LTE-A system, with the introduction of a function of relaying a signal on a link between an eNB and a UE to an RN, two links having different attributes apply to each of DL and UL carrier frequency bands. A link between the eNB and the RN is defined as a backhaul link. A backhaul link through which a signal is transmitted using downlink resources in Frequency Division Duplex (FDD) or Time Division Duplex (TDD) is called a backhaul downlink, whereas a link through which a signal is transmitted using uplink resources in FDD or TDD is called a backhaul uplink.

Figure 6:
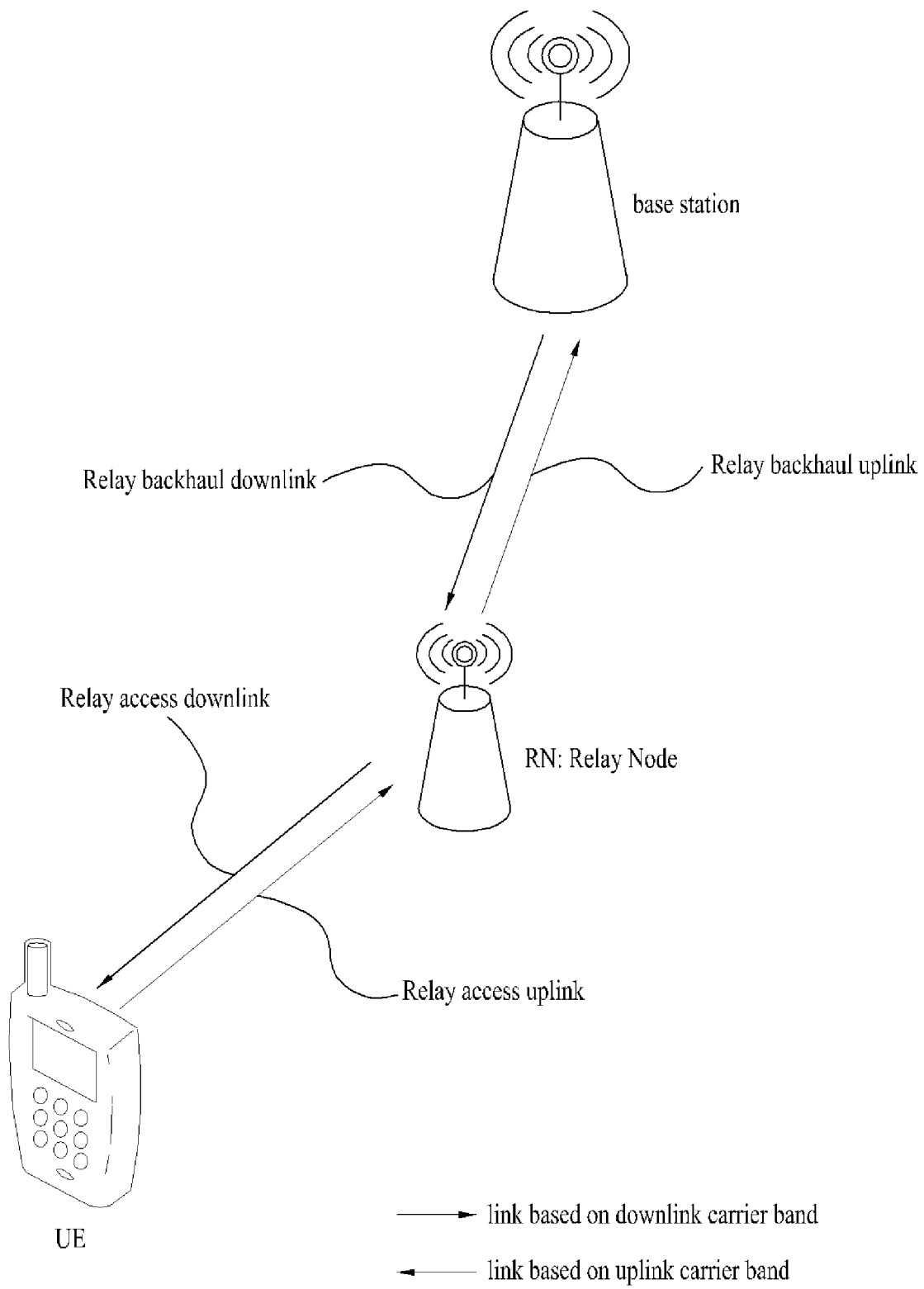
FIG. 6 illustrates a configuration of a relay backhaul link and a relay access link in a wireless communication system.

FIG. 6 illustrates a configuration of a relay backhaul link and a relay access link in a wireless communication system.

Referring to FIG. 6, with the introduction of a function of relaying a signal on a link between an eNB and a UE to an RN, two links having different attributes apply to each of downlink and uplink carrier frequency bands. A link between the eNB and the RN is defined as a backhaul link. A backhaul link through which a signal is transmitted using downlink resources in FDD or TDD is called a backhaul downlink, whereas a link through which a signal is transmitted using uplink resources in FDD or TDD is called a backhaul uplink.

Meanwhile, a link between an RN and a UE is defined as a relay access link. A relay access link through which a signal is transmitted in a downlink frequency band (in case of FDD) or in downlink subframe resources (in case of TDD) is called an access downlink, whereas a relay access link through which a signal is transmitted in an uplink frequency band (in case of FDD) or in uplink subframe resources (in case of TDD) is called an access uplink.

An RN may receive information from an eNB through a relay backhaul downlink and transmit information to the eNB through a relay backhaul uplink. In addition, the RN may transmit information to a UE through a relay access downlink and receive information from the UE through a relay access uplink.

With respect to an RN's usage of a frequency band (or spectrum), its operation can be classified into in-band and out-band. For an in-band RN, a backhaul link shares the same frequency band with an access link. If the backhaul link and the access link operate in different frequency bands, the RN is an out-band RN. In both in-band and out-band relaying, a UE (legacy UE) operating in the conventional LTE system (e.g. Release-8) should be able to access a donor cell.

Depending on whether a UE is aware of the existence of an RN, RNs may be classified into a transparent RN and a non-transparent RN. If the UE does not perceive whether it communicates with a network via an RN, the RN is a transparent RN. In contrast, if the UE perceives whether it communicates with a network via an RN, the RN is a non-transparent RN.

In relation to control of RNs, RNs may be classified into an RN configured as a part of a donor cell and an RN that self-controls a cell.

The former RN may have an RN ID, although it does not have its own cell ID. If at least a part of Radio Resource Management (RRM) of an RN is controlled by an eNB covering the donor cell, the RN is regarded as configured as a part of the donor cell (even though the other parts of the RRM reside in the RN). Preferably, this RN can support legacy UEs (e.g. LTE UEs). For instance, smart repeaters, decode-and-forward relays, various types of L2 RNs, and type-2 RNs form a part of a donor cell.

The latter RN controls one or more cells. The cells are allocated their unique physical cell IDs and they may use the same RRM mechanism. From the viewpoint of a UE, there is no distinction between accessing a cell controlled by an RN and accessing a cell controlled by a macro eNB. Preferably, a cell controlled by this type of RN may support legacy UEs. For example, RNs of this type include self-backhauling RNs, L3 RNs, type-1 RNs, and type-1a RNs.

A type-1 RN is an in-band RN that controls a plurality of cells. Each of the plurality of cells appears to a UE as a separate cell distinct from a donor cell. The plurality of cells have their own physical cell IDs (as defined in LTE Release-8) and the RN can transmit its own synchronization channels, RSs, etc. During a single-cell operation, a UE may receive scheduling information and an HARQ feedback directly from the RN and transmit its control channels (a Scheduling Request (SR), a CQI, an ACK/NACK, etc.) to the RN. The type-1 RN appears as a legacy eNB (operating in conformance to LTE Release-8) to a legacy UE (conforming to LTE Release-8). That is, the type-1 RN has backward compatibility. On the other hand, to LTE-A UEs, the type-1 RN appears different from a legacy eNB. Thus the type-1 RN can enhance performance.

Except for its out-band operation, a type-1a RN is characterized by the same set of features as the type-1 RN. The type-1a RN may be configured such that the influence of its operation on an L1 operation is minimized or eliminated.

A type-2 RN is an in-band RN that does not have its own physical cell ID and thus does not form a new cell. Since the type-2 RN is transparent to legacy UEs, the legacy UEs do not notice the existence of the type-2 RN. The type-2 RN can transmit a PDCCH but does not transmit at least a Common RS (CRS) and a PDCCH.

In order to allow in-band relaying, some resources in the time-frequency domain should be set aside for a backhaul link and these resources may be set not to be used for an access link. This is called resource partitioning.

A description will be given of the general principle of resource partitioning at an RN. A backhaul downlink and an access downlink may be TDM-multiplexed in one carrier frequency (that is, only one of the backhaul downlink and the access downlink is activated at a specific time). Similarly, a backhaul uplink and an access uplink may be TDM-multiplexed in one carrier frequency (that is, only one of the backhaul uplink and the access uplink is activated at a specific time).

Multiplexing of backhaul links in FDD is performed such that backhaul downlink transmission and backhaul uplink transmission take place in a downlink frequency band and an uplink frequency band, respectively. In comparison, multiplexing of backhaul links in TDD is performed such that backhaul downlink transmission and backhaul uplink transmission take place in a downlink subframe between an eNB and an RN and an uplink subframe between the eNB and the RN, respectively.

In case of an in-band RN, for example, if backhaul downlink reception from an eNB and access downlink transmission to a UE are performed simultaneously in the same frequency band, a signal transmitted from the transmitter of the RN may be received at the receiver of the RN. As a result, signal interference or Radio Frequency (RF) jamming may occur at the RF front-end of the RN. Likewise, if access uplink reception from a UE and backhaul uplink transmission to an eNB take place simultaneously in the same frequency band, the RF front-end of the RN may experience signal interference. Therefore, simultaneous eNB-to-RN and RN-to-UE transmissions in the same frequency band may not be feasible unless a reception signal and a transmission signal are sufficiently isolated from each other (e.g. a Transmission (Tx) antenna is geographically apart enough from a Reception (Rx) antenna (e.g. installed on the ground/underground)).

One way to handle the signal interference is to operate the RN such that while the RN is receiving a signal from a donor cell, it is not transmitting signals to UEs. That is, a gap is created in the RN-to-UE transmission and UEs (including legacy UEs) are not supposed to expect any RN transmission during the gap. This gap may be created by configuring a Multicast Broadcast Single Frequency Network (MBSFN) subframe.

Figure 7:
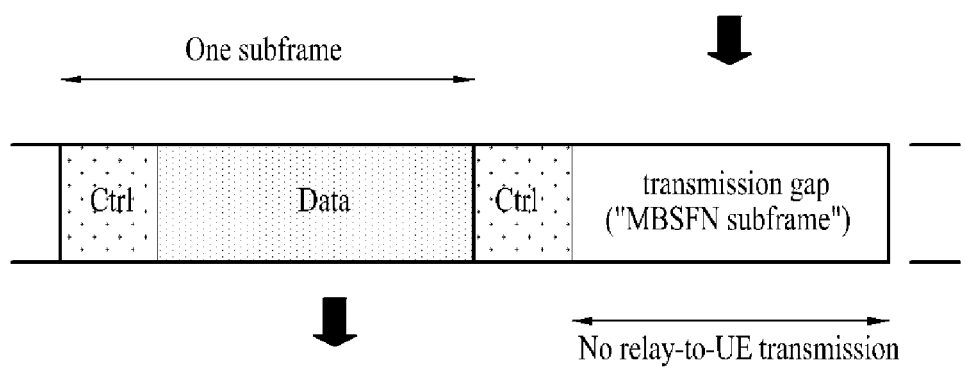
FIG. 7 illustrates an example of relay node resource partitioning.

FIG. 7 illustrates an example of RN resource partitioning.

Figure 10:
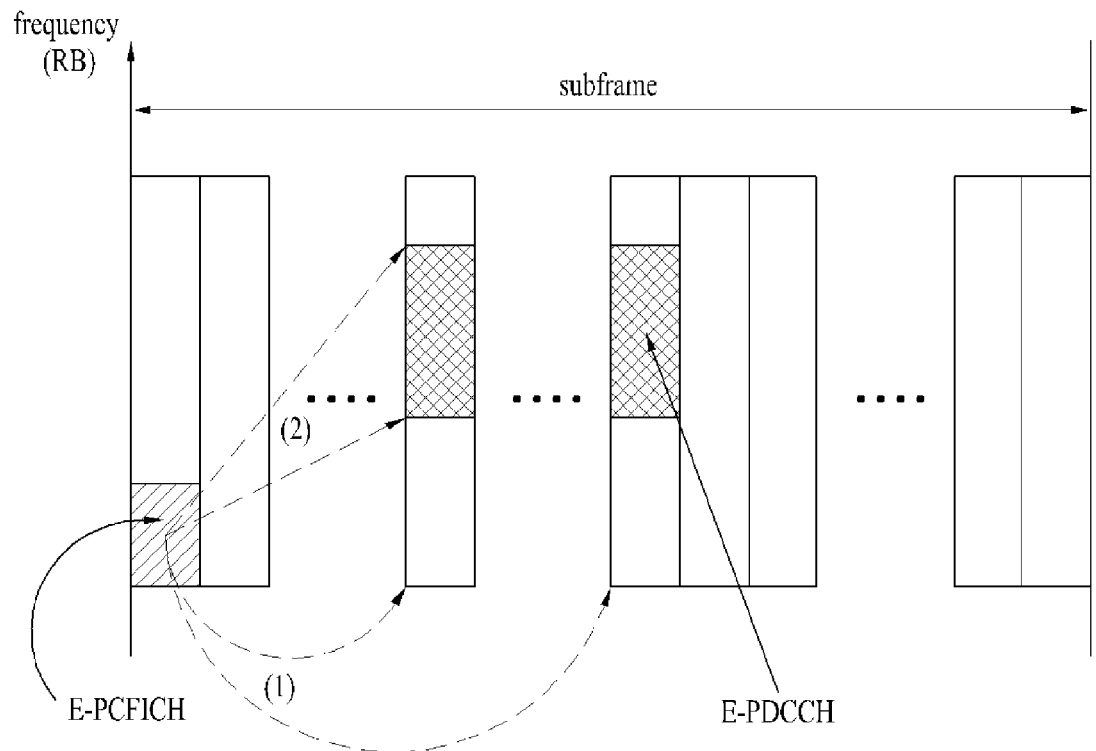

In FIG. 10, a first subframe is a general subframe in which an RN transmits a downlink (i.e. an access downlink) control signal and data to a UE and a second subframe is an MBSFN subframe in which the RN transmits a control signal to a UE in the control region of a DL subframe but no transmission occurs from the RN to a UE in the other region of the DL subframe. Since a legacy UE expects PDCCH transmission in every DL subframe (in other words, the RN needs to allow legacy UEs within its area to receive a PDCCH in each subframe and thus support a measurement function), it is necessary to transmit a PDCCH in every DL subframe to ensure reliable operations of legacy UEs. Therefore, the RN needs access downlink transmission in the first N (N=1, 2 or 3) OFDM symbols of even a subframe (a second subframe 1020) configured for downlink (i.e. backhaul downlink) transmission from an eNB to the RN, instead of backhaul downlink reception. Since the RN transmits a PDCCH to UEs in the control region of the second subframe, backward compatibility may be provided to legacy UEs served by the RN. The RN may receive a signal from the eNB in the remaining region of the second subframe in which no transmission occurs from the RN to UEs. Thus, an in-band RN does not perform access downlink transmission and backhaul downlink reception simultaneously by the above-described resource partitioning.

The second subframe using an MBSFN subframe will be described in detail. The control region of the second subframe may be referred to as an RN non-hearing period. An RN transmits an access downlink signal without receiving a backhaul downlink signal in the RN non-hearing period. The RN non-hearing period may have 1, 2 or 3 OFDM symbols. The RN may transmit an access downlink signal to a UE in the RN non-hearing period and receive a backhaul downlink signal from an eNB in the other period. Since the RN cannot perform transmission and reception simultaneously in the same frequency band, time is taken for the RN to switch from Tx mode to Rx mode. Therefore, a Guard Time (GT) needs to be set in a starting part of the backhaul downlink reception area, for Tx/Rx mode switching of the RN. Similarly, when the RN receives a backhaul downlink signal from the eNB and transmits an access downlink signal to a UE, a GT may be set for Rx/Tx mode switching of the RN. The length of a GT may be a time-domain value, for example, k (k>1) time samples ($T_s$) or one or more OFDM symbols. Or when RN backhaul downlink subframes are successively configured or according to a predetermined subframe timing alignment relationship, a GT may not be defined or set at the end of a subframe. To maintain backward compatibility, a GT may be defined only in a frequency area set for backhaul downlink subframe transmission (if a GT is set in an access downlink period, legacy UEs cannot be supported). The RN may receive a PDCCH and a PDSCH from the eNB in the backhaul downlink reception period except for the GT. The PDCCH and PDSCH may be called an R-PDCCH and an R-PDSCH to indicate that they are RN dedicated physical channels.

It is expected that the future-generation mobile communication standard, LTE-A will support Coordinated Multi-Point (CoMP) transmission, compared to the legacy standard, in order to increase data rate. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In downlink CoMP-JP, a UE may instantaneously receive data simultaneously from eNBs that perform CoMP transmission and combine the received signals, thereby increasing reception performance (Joint Transmission (JT)). In addition, one of the eNBs participating in the CoMP transmission may transmit data to the UE at a specific time point (Dynamic Point Selection (DPS)). In contrast, in downlink CoMP-CS/CB, a UE may receive data instantaneously from one eNB, that is, a serving eNB by beamforming.

In uplink CoMP-JP, eNBs may receive a PUSCH signal from a UE at the same time (Joint Reception (JR)). In contrast, in uplink CoMP-CS/CB, only one eNB receives a PUSCH. Herein, cooperative cells (or eNBs) may make a decision as to whether to use CoMP-CS/CB.

Figure 8:
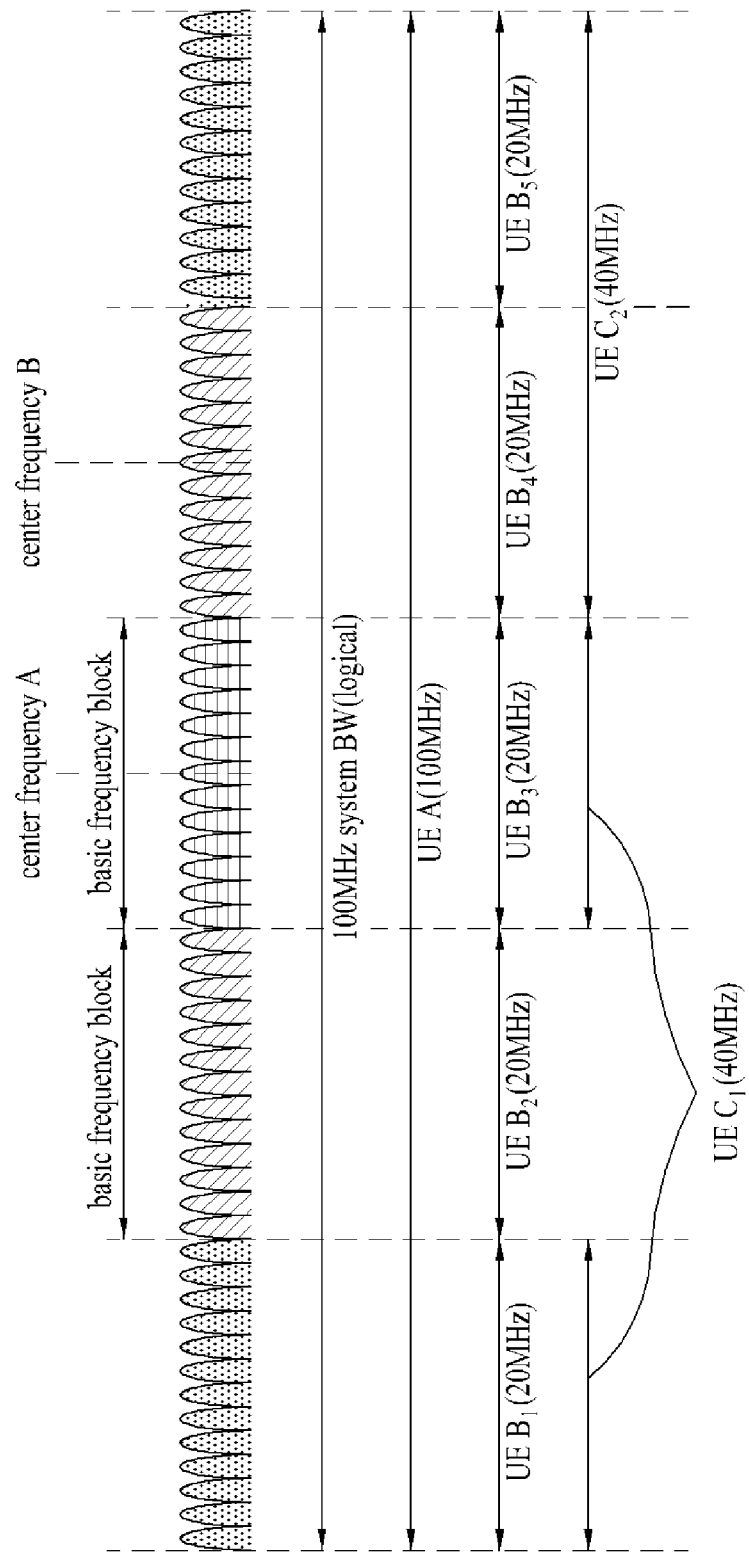
FIG. 8 illustrates the concept of carrier aggregation.

Now, carrier aggregation will be described below. FIG. 8 illustrates the concept of carrier aggregation.

Carrier aggregation refers to aggregation of a plurality of frequency blocks or cells (in the logical sense of the term) including uplink resources (or UL Component Carriers (CCs)) and/or downlink resources (or DL CCs) into one broad logical frequency band at a UE in order to a use broader frequency band in a wireless communication system. For clarity of description, the term CC will be used uniformly.

Referring to FIG. 8, a total system band is a logical band having a bandwidth of up to 100 MHz. The system band includes five CCs, each CC having a bandwidth of up to 20 MHz. A CC includes one or more contiguous physical subcarriers. While each CC is shown as having the same bandwidth in FIG. 8 by way of example, each CC may have a different bandwidth. In addition, while the CCs are shown as adjacent to each other in the frequency domain, this configuration is logical. Therefore, the CCs may be contiguous or non-contiguous physically.

Each CC may have a different center frequency or physically adjacent CCs may have a common center frequency. For example, if all CCs are physically contiguous, they may commonly have center frequency A. On the other hand, if the CCs are not contiguous physically, the CCs may have different center frequencies A, B, etc.

In the disclosure, a CC may correspond to the system band of a legacy system. Backward compatibility and system design may be facilitated in a wireless communication environment in which evolved UEs coexist with legacy UEs, by defining a CC from the perspective of the legacy system. For example, when the LTE-A system supports carrier aggregation, each CC may correspond to the system band of the LTE system. In this case, a CC may have one of the bandwidths, 1.25, 2.5, 5, 10, and 20 MHz.

When a total system band is extended by carrier aggregation, a frequency band used for communication with a UE is defined in units of a CC. A total system bandwidth, 100 MHz may be available to UE A and thus UE A may communicate using five CCs. Only 20 MHz may be available to each of UEs $B_1$ to $B_5$ and thus each of UEs $B_1$ to $B_5$ may use one CC, for communication. Each of UEs $C_1$ and $C_2$ may use 40 MHz and thus may communicate in two CCs. The two CCs may or may not be contiguous logically/physically. In the illustrated case of FIG. 8, UE $C_1$ uses two non-contiguous CCs, whereas UE $C_2$ uses two contiguous CCs.

The LTE system uses one DL CC and one UL CC, whereas the LTE-A system may use a plurality of CCs as illustrated in FIG. 8. A data channel may be scheduled by a control channel by conventional linked carrier scheduling or cross carrier scheduling.

In linked carrier scheduling, a control channel transmitted in a specific CC schedules only a data channel of the specific CC, as in the legacy LTE system using a single CC.

In cross carrier scheduling, a control channel transmitted in a primary CC schedules a data channel transmitted in the primary CC or any other CC by means of a Carrier Indicator Field (CIF).

Meanwhile, many techniques have been discussed in order to cancel inter-cell interference in a wireless mobile communication network in which a plurality of types of cells coexist. Particularly, if cells are of different types, mutual interference becomes serious. For example, interference between a macro cell (hereinafter, referred to as cell A) and a small-size, low-power cell such as a picocell or a femtocell (hereinafter, referred to as cell B) causes a more serious problem than interference between macro cells. For example, when cell B communicates with a UE of cell B during communication between cell A and a UE of cell A, the UE of cell B may receive strong interference from cell A.

In the 3GPP LTE system, a downlink subframe usually carries a PDCCH and a PDSCH. If cell A and cell B belong to the same LTE system, cell A and cell B use the same subframe configuration. If cell A and cell B transmit signals in different subframes, downlink transmission from cell A may not interfere with downlink transmission from cell B. That is, cell A and cell B use limited subframe resources in time division. However, this scheme reduces resource use efficiency significantly. Accordingly, a scheme in which the two cells share the same subframe by dividing frequency resources or spatial resources is better. Or the two schemes may be efficiently used in combination.

Another method of reducing inter-cell interference is that a data channel of cell A is divided spatially and steered in a different direction so that interference with cell B is minimized. That is, a transmission beam is steered in a corresponding direction of a specific UE by applying precoding to cell A, thus avoiding interference. As a consequence, the influence of the data channel from cell A on a data channel from cell B can be reduced remarkably.

However, a control channel is generally transmitted across a total system band and decoded using a Common Reference Signal (CRS). If the control channel is precoded, a receiver needs information about the precoding to detect and decode the control channel. Since the precoding information is also delivered on a control channel, the receiver cannot decode the control channel eventually. Accordingly, to make this operation viable, an additional RS is required to decode a control channel successfully, which may increase transmission and reception complexity.

Another method of avoiding inter-cell interference is to decode a control channel such as a PCFICH or a PHICH using a CRS as done conventionally for a PDCCH. However, different methods should apply to different control channel types. For example, it may be regulated that a PDCCH is transmitted at a specific position of a PDSCH resource region and a PCFICH and a PHICH are transmitted in the first symbol or up to the fourth symbols.

It may also be contemplated that the PCFICH, PHICH, and CRS are located in the first OFDM symbol and the PDCCH is transmitted after the third symbol. Obviously, a UL grant or a DL grant transmitted on the PDCCH may reside in the second slot as well as in the first slot. Or the DL grant may be located only in the first slot, while the UL grant may be located only in the second slot. It is assumed herein that broadcast important system information, that is, a BCH, a PCH, an SCH, etc. are transmitted in the conventional manner.

A new control channel distinguished from the existing PDCCH is referred to as an Enhanced PDCCH (or E-PDCCH). When needed, the E-PDCCH may be precoded and decoded using a dedicated RS such as a DM-RS. In addition, interference with a corresponding subframe of cell B may be minimized by applying the same precoding to the E-PDCCH and the PDSCH, when needed. Although control information such as a PCFICH positioned in the first symbol may still cause more or less interference, interference from the main interference factors, PDCCH and PDSCH may be reduced considerably by beamforming. Furthermore, since the PCFICH is subject to inter-cell hopping based on a Cell ID, it is quite robust against inter-cell interference.

Methods for designing an E-PDCCH and an E-PHICH and a UE operation using the same will be described below based on the above-described concept.

Embodiment 1

A UE may determine the number of symbols used for a PDCCH from a CFI included in a PCFICH. [Table 1] below lists codewords corresponding to CFI values defined by the present LTE standard. Particularly, a state corresponding to a CFI value of 4 is reserved.

TABLE 1

| CFI | CFI code word $<b_0, b_1, \ldots, b_{31}>$ |
| --- | --- |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

An Enhanced PCFICH or E-PCFICH of the present invention may indicate the starting symbols of an E-PDCCH and a PDSCH as well as the number of PDCCH symbols. In this case, the starting position of the E-PDCCH or the PDSCH may be changed according to the number of PDCCH symbols.

Specifically, if an eNB transmits the E-PCFICH in the first symbol of a subframe and starts to transmit the E-PDCCH or PDSCH in a $k^{th}$ symbol, a UE may determine the value of k from the E-PCFICH and receive the E-PDCCH and the PDSCH at the determined position. That is, the CFI of the E-PCFICH may indicate the starting position k of the E-PDCCH or the PDSCH.

In addition, the E-PCFICH may indicate the frequency-domain position of the E-PDCCH as well as the time-domain position of the E-PDCCH. If only the E-PDCCH exists without any PDCCH, the E-PCFICH may be translated differently and serve a new usage.

While the CFI values of the PCFICH are still interpreted in the conventional manner, the reserved state may be used for various usages. If CFI=4, this may indicate that the E-PDCCH is used without any PDCCH. That is, this value may implicitly indicate the existence of only a UE using the E-PDCCH in the corresponding subframe.

The E-PDCCH may be located at a fixed position and the position of the E-PDCCH may be changed by RRC signaling. Preferably, an initial E-PDCCH position is set so that an E-PDCCH may be decoded successfully during initial access. Or the position of the E-PDCCH may be changed in a subframe carrying a PDCCH. Likewise, the position of the E-PDCCH may be indicated or changed more freely by additional RRC signaling.

Or if the eNB signals a CFI value indicating the reserved state in the PCFICH, that is, CFI=4, the UE may interpret the CFI value of 4 as transmission of an E-PDCCH and thus operation relying only on the E-PDCCH or as transmission of both a PDCCH and an E-PDCCH and decoding of the PDCCH and the E-PDCCH. Or the two interpretation methods may be set or changed by additional RRC signaling.

If the reserved state is set in a general subframe, an E-PDCCH is meaningless to a legacy UE in the frame and thus the legacy UE is likely to have a problem in its operation. To avert the problem, the eNB does not schedule the legacy UE.

A case corresponding to one of the two interpretations will be described in detail.

1) If the CFI set to 4 indicates use of an E-PDCCH only, it is preferred to configure the E-PDCCH to be used only in a specific subframe such as an MBSFN subframe. That is, the E-PDCCH is limited to a subframe configured for an LTE-A UE, not an LTE UE. The LTE-A UE acquires a UL grant and a DL grant only from the E-PDCCH.

2) If the CFI set to 4 indicates use of both a PDCCH and an E-PDCCH, it is preferred to receive a BCH, a PCH, etc. in a common search space of a PDCCH region, while receiving a UL grant and a DL grant in a dedicated search space of an E-PDCCH region.

If the E-PDCCH is available only in a specific subframe such as an MBSFN subframe, the specific subframe is preferably configured only for LTE-A UEs. Particularly, one or two symbols are allocated to a PDCCH region in the MBSFN subframe.

If the eNB schedules only LTE-A UEs, excluding LTE UEs, the PCFICH may be designed to be interpreted in a different manner from the conventional manner. For example, all states indicated by CFI values in the PCFICH may be used to indicate PDCCH and E-PDCCH regions and the use or non-use of a PDCCH and an E-PDCCH.

For example, among the four states listed in [Table 1], a CFI value of "1" may indicate one PDCCH symbol and non-use of an E-PDCCH, a CFI value of "2" may indicate two PDCCH symbols and non-use of an E-PDCCH, a CFI value of "3" may indicate use of both a PDCCH and an E-PDCCH and the number of PDCCH symbols limited to 1 or 2, and a CFI value of "4" may indicate use of an E-PDCCH only.

Meanwhile, if CFI=4 indicating a reserved state as in 1) and 2), the number of PDCCH symbols needs to be assumed. In this case, regarding a PDCCH region, it may be assumed that K=0, 1, 2, . . . irrespective of actual transmission of a PDCCH. Even though a PDCCH is not transmitted, if K=1, symbol index #0 is not used for an E-PDCCH or a PDSCH. Rather, the E-PDCCH or PDSCH may start in symbol index #1. The value of K may be fixed or changed by RRC signaling.

TABLE 2

| PHICH duration | Non-MBSFN subframes | | MBSFN subframes on a carrier supporting PDSCH |
|---|---|---|---|
| | Subframes 1 and 8 in case of frame structure type 2 | All other cases | |
| Normal | 1 | 1 | 1 |
| Extended | 2 | 3 | 2 |

TABLE 3

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN suframes (except subframe 6 for frame structure type 2) configured with positioning reference signals | 1, 2, 3 | 2, 3 |
| All other cases | 1, 2, 3 | 2, 3, 4 |

[Table 2] lists PHICH durations, that is, numbers of symbols available for a PHICH, and [Table 3] lists numbers of PDCCH symbols according to bandwidths and subframe types.

As illustrated in [Table 2] and [Table 3], a PHICH duration may be associated with K. That is, the value of K may be set to be equal to a PHICH duration in a subframe. Then a UE may determine the ending time of a PDCCH without additional signaling. For example, if the PHICH duration of an MBSFN subframe is normal ("1"), K may be 1 and if the PHICH duration of an MBSFN subframe is extended ("2"), K may be 2. However, in the case of the normal PHICH duration, the PDCCH may be longer than the PHICH. Then the number of symbols for a PDCCH region may be indicated by RRC signaling.

However, if the extended PHICH duration is set for a non-MBSFN subframe, the PDCCH may occupy up to 3 OFDM symbols. Therefore, a CFI value may be mapped to a PHICH duration so that an LTE-A UE may determine from the duration of the PHICH that the CFI is 3. Obviously, this method is introduced to set the starting symbol of the E-PDCCH. From the perspective of interpretation, the CFI is 3, which has nothing to do with an actual transmission region.

Meanwhile, a higher-layer parameter "pdsch-Start" is defined to signal the starting position of a PDSCH in the LTE-A standard using carrier aggregation. The position of the starting symbol of an E-PDCCH may be signaled by the parameter. For example, if cross carrier scheduling is used without carrier aggregation, "pdsch-Start" may be transmitted and thus may be used as information indicating the position of the starting symbol of an E-PDCCH.

Figure 9:
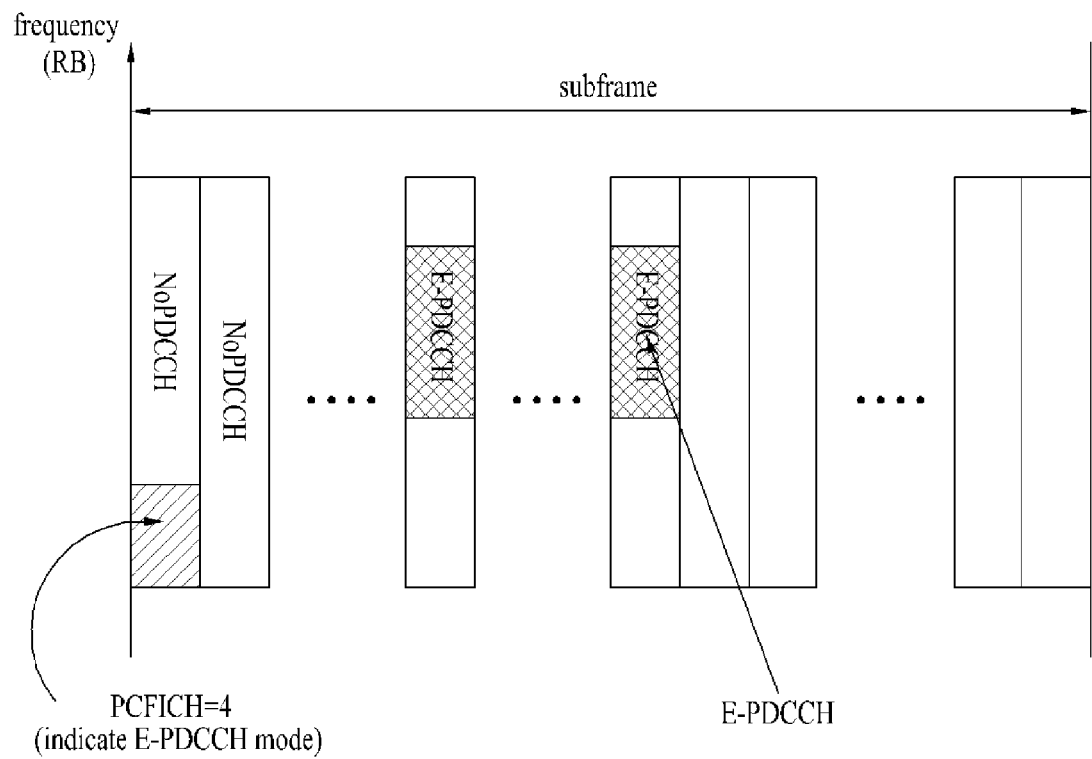
FIGS. 9, 10 and 11 illustrate exemplary methods for signaling position information about an Enhanced Physical Downlink Control Channel (E-PDCCH) according to embodiments of the present invention.
Figure 11:
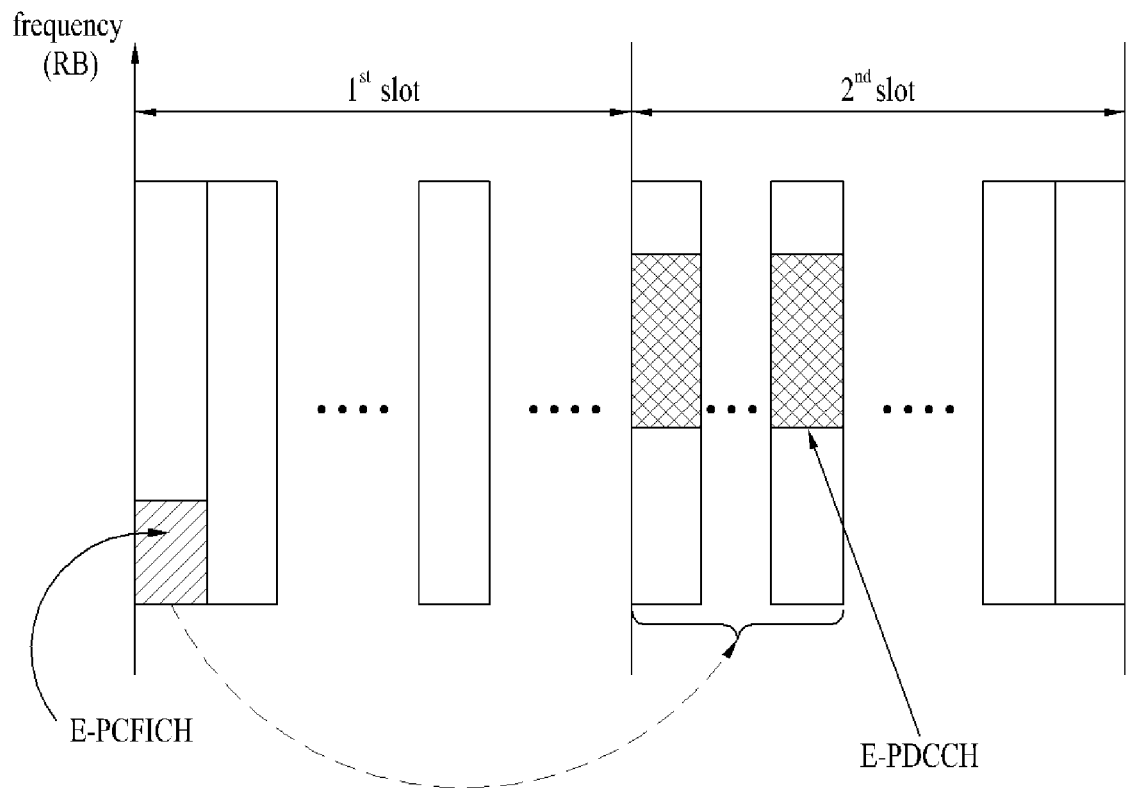

FIGS. 9, 10 and 11 illustrate exemplary methods for signaling position information about an E-PDCCH according to embodiments of the present invention.

FIG. 9 illustrates a case where a CFI of 4 in a PCFICH indicates the existence of an E-PDCCH only, without any PDCCH in a subframe.

FIG. 10 illustrates a case where the symbol positions and frequency positions of an E-PDCCH are indicated by an E-PCFICH. In this case, it is preferred that no legacy UE exists in a corresponding subframe.

Or the E-PCFICH may indicate the total number of symbols occupied by the E-PDCCH. It is assumed herein that the starting or ending symbol of the E-PDCCH is fixed or preset by RRC signaling.

Finally, FIG. 11 illustrates a case where an E-PDCCH resides in the second slot. In this case, the E-PCFICH may indicate the index of the last symbol of the E-PDCCH in the second slot or the number of OFDM symbols for the E-PDCCH in the second slot. In this case, it is assumed that the E-PDCCH is designed to be steered in a specific direction together with a PDSCH by beamforming, rather than the E-PDCCH is transmitted across a total frequency band.

As described before, the E-PCFICH functions as the conventional PCFICH and only LTE-A UEs may demodulate and decode the E-PCFICH. Thus, the number and positions of OFDM symbols mapped to the E-PDCCH are preferably limited to a specific value and specific position(s). For example, when a normal CP is used, the last one to three symbols of the first slot are allocated to the E-PDCCH.

Or the E-PDCCH may be fixed in a specific symbol. For example, if the E-PCFICH is 0, the E-PDCCH is configured to start in the second symbol, if the E-PCFICH is 1, the E-PDCCH is configured to start in the third symbol, if the E-PCFICH is 2, the E-PDCCH is configured to start in the fourth symbol, and if the E-PCFICH is 3, the E-PDCCH is configured to start in the fifth symbol.

[Table 4] below lists the indexes of starting symbols for an E-PDCCH according to values of an E-PCFICH in the first slot.

TABLE 4

| E-PCFICH | 0 | 1 | 2 | 3 |
|---|---|---|---|---|
| Starting symbol of E-PDCCH for $1^{st}$ slot (#1) | 1 | 2 | 3 | 4 |
| Starting symbol of E-PDCCH for $1^{st}$ slot (#2) | 2 | 3 | 4 | 5 |
| Starting symbol of E-PDCCH for $1^{st}$ slot (#3) | 3 | 4 | 5 | 6 |
| Starting symbol of E-PDCCH for $1^{st}$ slot (#4) | 4 | 5 | 6 | — |
| Starting symbol of E-PDCCH for $1^{st}$ slot (#5) | 5 | 6 | — | — |
| Starting symbol of E-PDCCH for $1^{st}$ slot (#6) | 6 | — | — | — |

TABLE 5

| E-PCFICH | 0 | 1 | 2 | 3 |
|---|---|---|---|---|
| Ending symbol of E-PDCCH for $2^{nd}$ slot (#1) | 0 | 1 | 2 | 3 |
| Ending symbol of E-PDCCH for $2^{nd}$ slot (#2) | 1 | 2 | 3 | 5 |
| Ending symbol of E-PDCCH for $2^{nd}$ slot (#3) | 2 | 3 | 4 | 5 |
| Ending symbol of E-PDCCH for $2^{nd}$ slot (#4) | 3 | 4 | 5 | 6 |
| Ending symbol of E-PDCCH for $2^{nd}$ slot (#5) | 4 | 5 | 6 | — |
| Ending symbol of E-PDCCH for $2^{nd}$ slot (#6) | 5 | 6 | — | — |

TABLE 5-continued

| E-PCFICH | 0 | 1 | 2 | 3 |
|---|---|---|---|---|
| Ending symbol of E-PDCCH for $2^{nd}$ slot (#7) | 6 | — | — | — |

If a DL grant and a UL grant are delivered in the first and second slots, respectively and the E-PDCCH is designed to have a variable number of symbols, it may occur that the starting and ending symbols of the two grants should be indicated by one E-PCFICH. In this case, the starting symbol of the DL grant may be limited to two positions and the ending symbol of the UL grant may be limited to two positions so that four CFI values may indicate the starting and ending positions of the DL and UL grants, respectively. It is also possible to increase the number of signaling cases by increasing the number of E-PDCCH states.

[Table 6] and [Table 7] illustrate examples of indicating both the starting and ending symbol indexes of an E-PDCCH by an E-PCFICH value. Specifically, [Table 6] illustrates a case where the starting symbol index of the E-PDCCH is 2 or 3 and [Table 7] illustrates a case where the starting symbol index of the E-PDCCH is 1 or 2.

TABLE 6

| | | Ending symbol of $2^{nd}$ slot PDCCH (e.g. UL grant) | |
|---|---|---|---|
| PCFICH value (state) | | 6 | 7 |
| Starting symbol of $1^{st}$ slot PDCCH (e.g. DL grant) | 2 | 0 | 1 |
| | 3 | 2 | 3 |

TABLE 7

| | | Ending symbol of $2^{nd}$ slot PDCCH (e.g. UL grant) | |
|---|---|---|---|
| PCFICH value (state) | | 6 | 7 |
| Starting symbol of $1^{st}$ slot PDCCH (e.g. DL grant) | 1 | 0 | 1 |
| | 2 | 2 | 3 |

Embodiment 2

Figure 12:
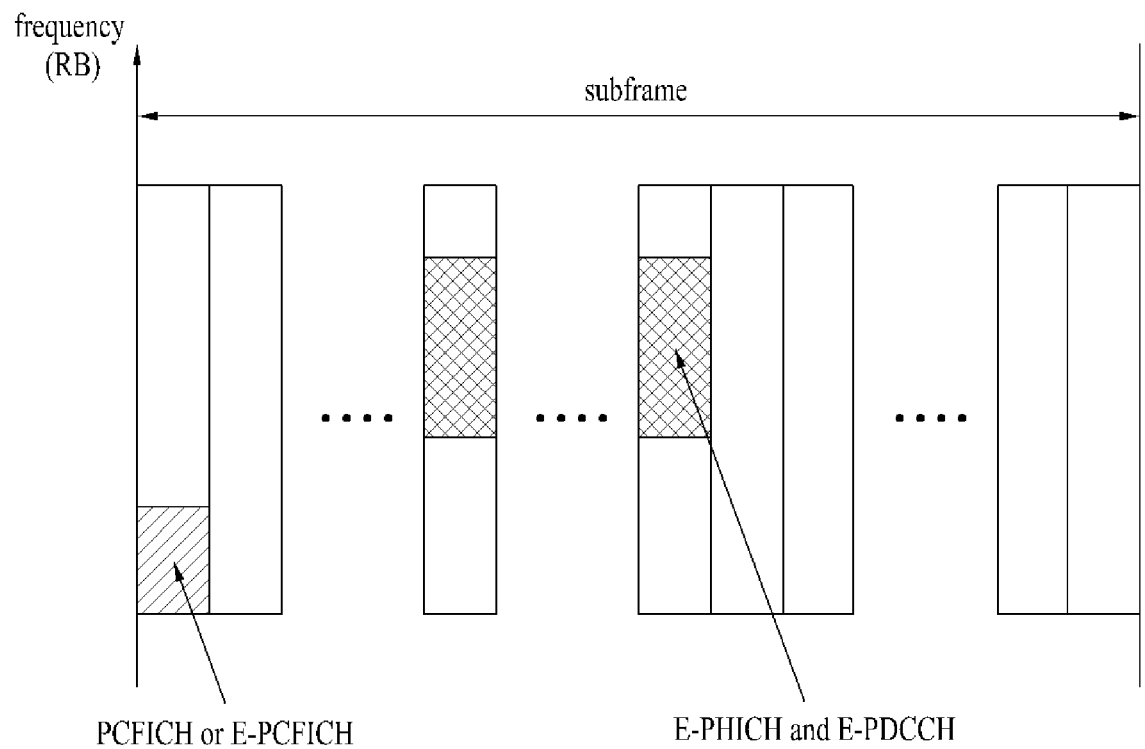
FIG. 12 illustrates exemplary transmission of an Enhanced Physical HARQ Indicator Channel (E-PHICH) according to another embodiment of the present invention.

An E-PHICH will be described according to another embodiment of the present invention. FIG. 12 illustrates an example of transmitting an E-PHICH according to another embodiment of the present invention.

1) Compared to the conventional PHICH, the E-PHICH may require an additional RS, for demodulation and may be transmitted in the conventional PDSCH region, like an E-PDCCH and an R-PDCCH. Designing the E-PHICH based on the conventional CRS may minimize the constraint of using an additional RS at the expense of degradation of channel estimation performance. With the conventional CRS, a PHICH may be positioned in the second slot.

E-PHICH resources are related to the number of allocated PUSCH resources. In addition, an E-PHICH for a specific UE is related to a UE ID, a subframe index, etc.

The E-PHICH resources are indicated by higher-layer signaling. The higher-layer signaling may be expressed as a bitmap or as Resource Allocation Type 0, 1 and 2 of the LTE system. The position of the E-PHICH in the determined resources may be indicated to each UE by higher-layer signaling or may be determined based on the index of an uplink scheduled resource.

Accordingly, the UE may receive its E-PHICH based on the higher-layer signaling and the index of the uplink scheduled resource. To reflect a change in a channel, it is preferred to allocate different E-PHICH resources at different time points.

The same precoding as used for an E-PDCCH and an R-PDSCH may apply to the E-PHICH and thus a beam may be formed for the E-PHICH such that interference with other cells is reduced.

2) The E-PHICH may be transmitted in a preset RB (e.g. at both ends of a frequency band). In this case, precoding for beamforming is not applied to the E-PHICH, which may cause inter-cell interference. Since an interfered cell may determine the position of the E-PHICH, it may avoid inter-cell interference through downlink scheduling excluding the frequency band. In addition, a plurality of E-PHICHs mapped to a specific RB may be multiplexed such that orthogonality is maintained among the E-PHICHs. The same orthogonalization method as used for CRS, CSI-RS, DM-RS, SRS, and PUCCH may apply to the E-PHICHs.

Embodiment 3

A method for operating a UE based on the above-described technical features according to a third embodiment of the present invention will be described.

The operation of a UE is characterized mainly in that the UE acquires a UL grant and a DL grant from an E-PDCCH. This implies that a different procedure from a conventional UE operation procedure is required.

It is assumed that the E-PDCCH is precoded with a PDSCH and thus a specific beam is formed. Hence, information of a PCFICH or an E-PCFICH may be used to appropriately demodulate the E-PDCCH. The PCFICH and the E-PCFICH may provide resource allocation information about an E-PHICH.

The proposed E-PDCCH may be used in combination with the E-PCFICH or the E-PHICH or with the conventional PCFICH or PHICH. Many operation procedures may be defined according to how the E-PDCCH is combined with other channels.

Figure 13:
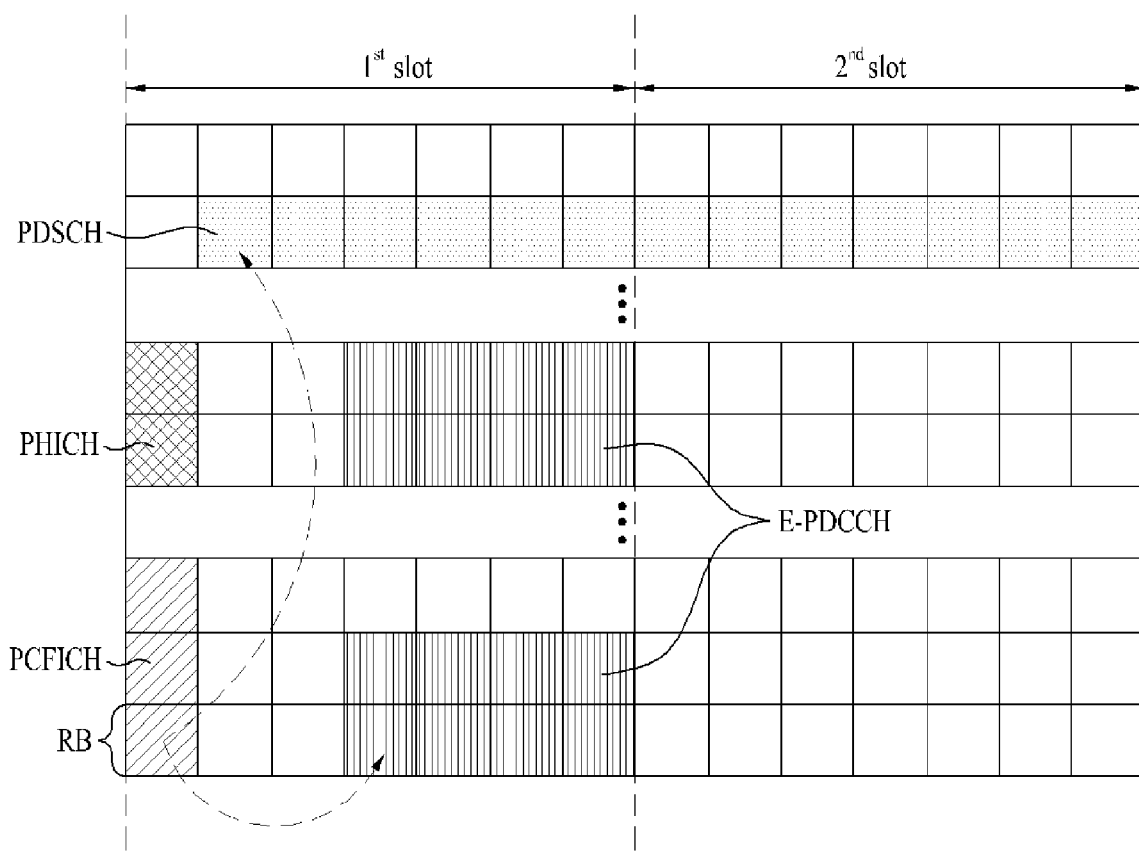
FIG. 13 illustrates exemplary transmission of an E-PDCCH according to an embodiment of the present invention.

FIG. 13 illustrates an example of transmitting an E-PDCCH according to an embodiment of the present invention.

Referring to FIG. 13, an E-PCFICH and an E-PDCCH are applied. An LTE-A UE acquires resource position information about the E-PDCCH and information about the starting symbol position of a PDSCH by demodulating the E-PCFICH. The UE also acquires HARQ ACK/NACK information from a PHICH.

Subsequently, the UE acquires a UL grant and a DL grant by decoding the E-PDCCH from a part of a PDSCH region, not the conventional PDCCH region. As described before, the conventional PCFICH may be used to indicate transmission of an E-PDCCH only.

A PDSCH may be demodulated and decoded using information about the starting symbol position of the PDSCH acquired from the E-PCFICH and the DL grant acquired from the E-PDCCH.

If the E-PDCCH is located at a fixed symbol position, it is possible to decode the E-PDCCH at the position. The symbol position of the E-PDCCH may be changed by RRC signaling.

The PDSCH is demodulated using decoded vales of allocated resources based on the decoding result of the E-PDCCH. The starting position of the PDSCH may depend on a CFI value. Preferably, the starting symbol of the E-PDCCH is preset to a specific symbol. However, the starting symbol position of the PDSCH may be changed by RRC signaling.

Figure 14:
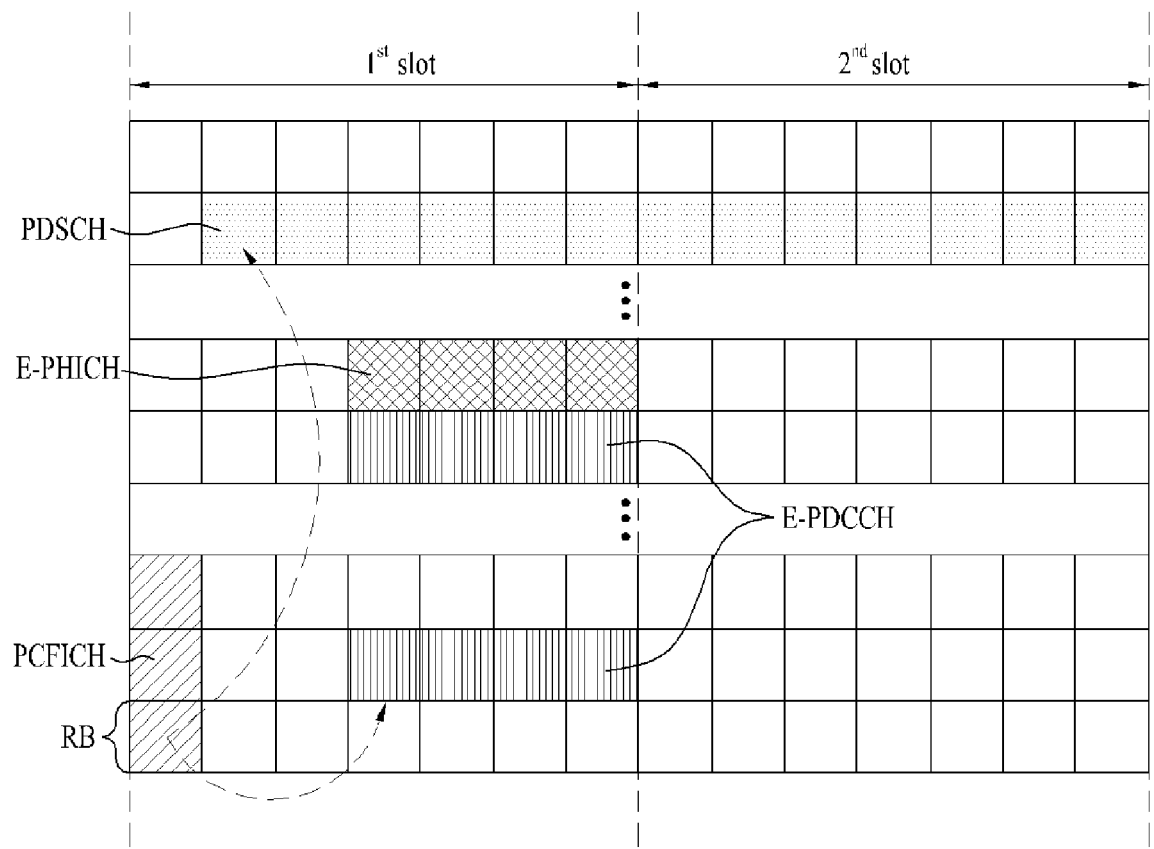
FIG. 14 illustrates exemplary transmission of an E-PDCCH and an E-PHICH according to an embodiment of the present invention.

FIG. 14 illustrates exemplary transmission of an E-PDCCH and an E-PHICH according to an embodiment of the present invention. Compared to FIG. 13, it is noted that an E-PHICH is transmitted along with an E-PDCCH in a data region carrying the conventional PDSCH, unlike a general PHICH.

Referring to FIG. 14, if an E-PHICH is transmitted in addition to an E-PCFICH and an E-PDCCH, a UE may recognize use of the E-PHICH by decoding the E-PCFICH. Information about resource positions and an orthogonal code of the E-PHICH may be acquired in the manner described in the second embodiment of the present invention.

As described before, the introduction of an E-PCFICH, an E-PHICH, and an E-PDCCH according to the present invention can minimize interference with neighbor cells. However, the introduction of the E-PCFICH makes it difficult to service legacy UEs in a corresponding subframe. In this case, a subframe supporting a legacy UE and a subframe dedicated to an LTE-A UE may be used separately. In order to minimize influence on legacy UEs, a subframe carrying an E-PCFICH may be configured as an MBSFN subframe.

Embodiment 4

Even though a PDSCH and an E-PDCCH are located at fixed positions, the fixed starting positions of the PDSCH and the E-PDCCH may be different according to the number of CRSs and a channel configuration.

For example, if a control region is configured to include only 2Tx CRSs and a PCFICH, the remaining region except for the first symbol is available to a PDSCH and an E-PDCCH. In this case, the fixed starting position of the PDSCH and E-PDCCH is the second symbol.

Likewise, in case of 4 Tx antennas, 4Tx CRSs are located even in the second symbol. Thus, the fixed starting position of the PDSCH and E-PDCCH is the third symbol. If an MBSFN subframe is used, the fixed starting position of the PDSCH and E-PDCCH may be different.

This means that the fixed starting position of the PDSCH and E-PDCCH is automatically determined without additional signaling according to an antenna configuration and a used channel.

Figure 15:
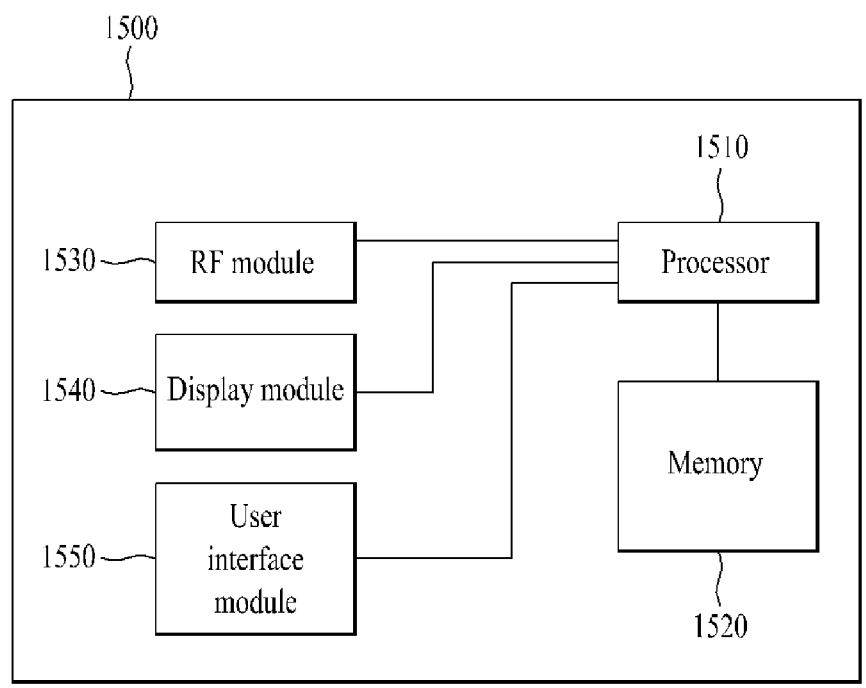
FIG. 15 is a block diagram of a communication apparatus according to an embodiment of the present invention.

FIG. 15 is a block diagram of a communication apparatus according to an embodiment of the present invention.

Referring to FIG. 15, a communication apparatus 1500 includes a processor 1510, a memory 1520, an RF module 1530, a display module 1540, and a User Interface (UI) module 1550.

The communication device 1500 is shown as having the configuration illustrated in FIG. 15, for clarity of description. Some modules may be added to or omitted from the communication apparatus 1500. In addition, a module of the communication apparatus 1500 may be divided into more modules. The processor 1510 is configured to perform operations according to the embodiments of the present invention described before with reference to the drawings. Specifically, for detailed operations of the processor 1510, the descriptions of FIGS. 1 to 14 may be referred to.

The memory 1520 is connected to the processor 1510 and stores an Operating System (OS), applications, program codes, data, etc. The RF module 1530, which is connected to the processor 1510, upconverts a baseband signal to an RF signal or downconverts an RF signal to a baseband signal. For this purpose, the RF module 1530 performs digital-to-analog conversion, amplification, filtering, and frequency upconversion or performs these processes reversely. The display module 1540 is connected to the processor 1510 and displays various types of information. The display module 1540 may be configured as, not limited to, a known component such as a Liquid Crystal Display (LCD), a Light Emitting Diode (LED) display, and an Organic Light Emitting Diode (OLED) display. The UI module 1550 is connected to the processor 1510 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the foregoing method and apparatus for transmitting and receiving downlink control information in a wireless communication system have been described in the context of a 3GPP LTE system, by way of example, they are also applicable to various other wireless communication systems.

The invention claimed is:

1. A method for receiving downlink channels from a base station at a user equipment in a wireless communication system, the method comprising:

receiving a control format indicator channel from the base station in a subframe comprising a plurality of symbols; and receiving at least one of a first control channel or a second control channel in the subframe from the base station, wherein a starting symbol of the first control channel is a first symbol of the plurality of symbols, wherein a starting symbol of the second control channel is determined according to information included in the control format indicator channel or a Radio Resource Control (RRC) layer signaling, and wherein:

if a parameter on the starting symbol of the second control channel is configured via the RRC layer signaling, the starting symbol of the second control channel is determined based on the parameter, otherwise, the starting symbol of the second control channel is determined based on the information included in the control format indicator channel.

2. The method according to claim 1, wherein information included in the control format indicator channel indicates both the starting symbol of the second control channel and an ending symbol of the first control channel.

3. The method according to claim 1, wherein information included in the control format indicator channel includes information on frequency resources for the second control channel.

4. The method according to claim 1, wherein information included in the control format indicator channel includes information indicating whether the first control channel exists or not in the subframe.

5. A user equipment in a wireless communication system, the user equipment comprising:

a reception module for receiving downlink channels from a base station; and a processor for processing the downlink channels, wherein the reception module receives a control format indicator channel from the base station in a subframe comprising a plurality of symbols and receive at least one of a first control channel or a second control channel in the subframe from the base station, and wherein a starting symbol of the first control channel is a first symbol of the plurality of symbols, wherein the processor determines a starting symbol of the second control channel according to information included in the control format indicator channel or a Radio Resource Control (RRC) layer signaling, and wherein:

if a parameter on the starting symbol of the second control channel is configured via the RRC layer signaling, the processor determines the starting symbol of the second control channel based on the parameter, otherwise, the processor determines the starting symbol of the second control channel based on the information included in the control format indicator channel.

6. The user equipment according to claim 5, wherein information included in the control format indicator channel indicates both the starting symbol of the second control channel and an ending symbol of the first control channel.

7. The user equipment according to claim 5, wherein information included in the control format indicator channel includes information on frequency resources for the second control channel.

8. The user equipment according to claim 5, wherein information included in the control format indicator channel includes information indicating whether the first control channel exists or not in the subframe.

* * * * *